F. M. LEAVITT.
EXPLODER FOR AUTOMOBILE TORPEDOES.
APPLICATION FILED MAY 2, 1908.

953,848.

Patented Apr. 5, 1910.
5 SHEETS—SHEET 1.

WITNESSES:

INVENTOR:
Frank M. Leavitt,
By Attorneys,

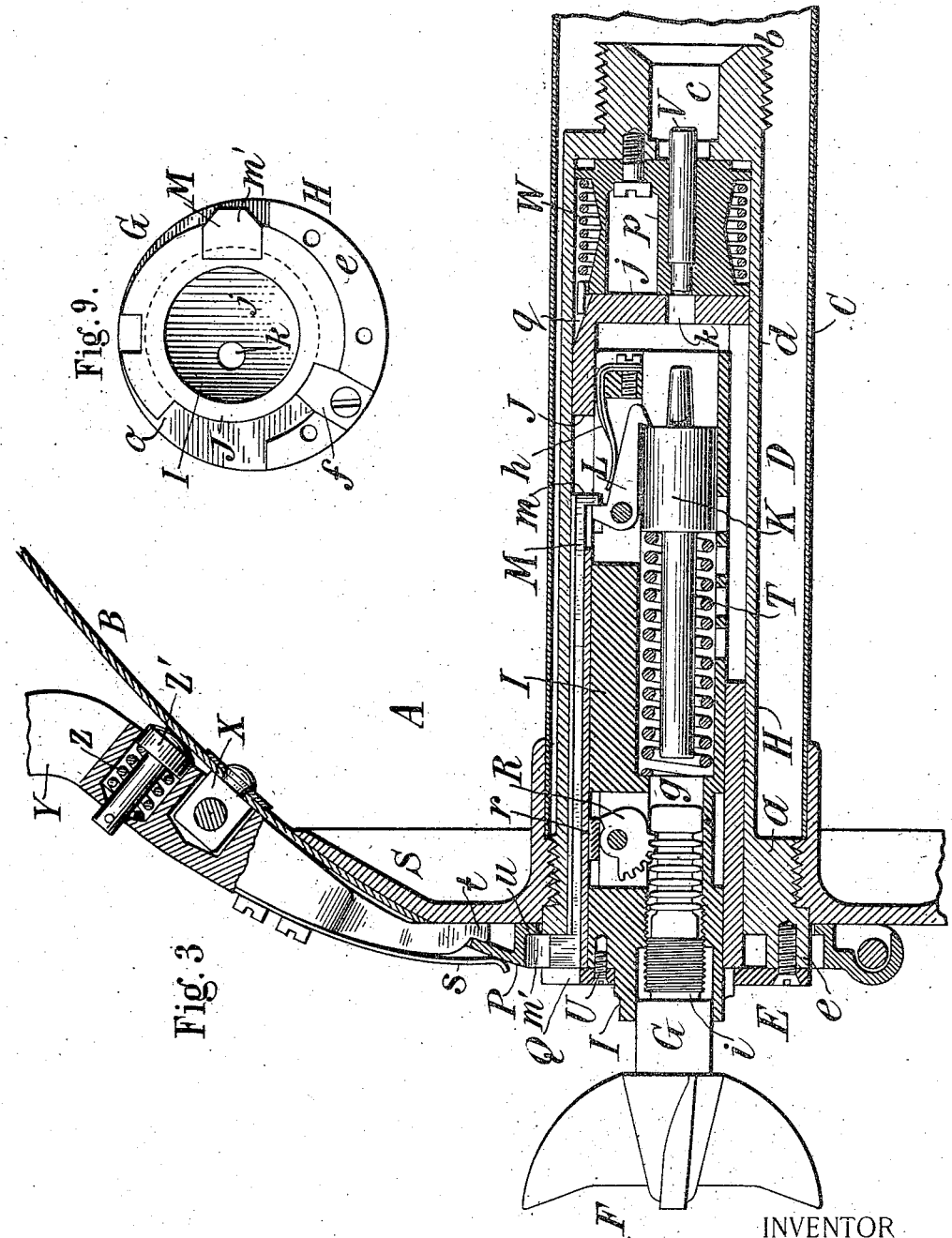

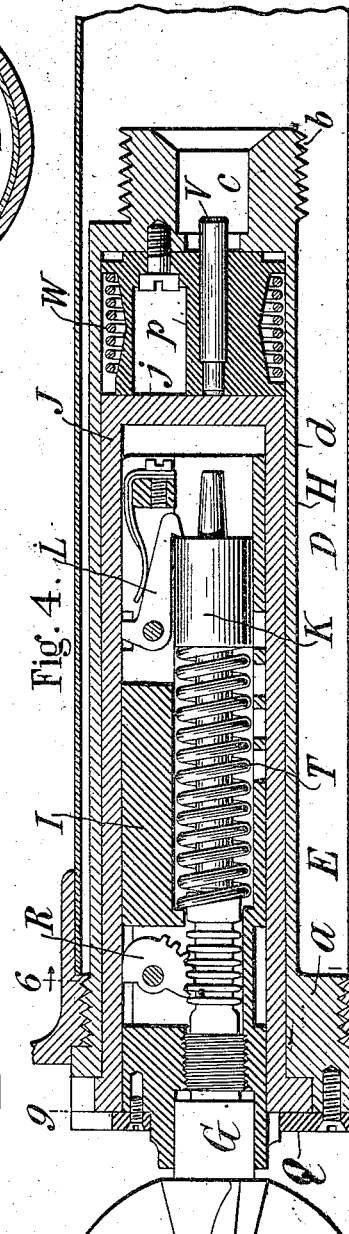

F. M. LEAVITT.
EXPLODER FOR AUTOMOBILE TORPEDOES.
APPLICATION FILED MAY 2, 1908.
953,848.
Patented Apr. 5, 1910.
5 SHEETS—SHEET 4.
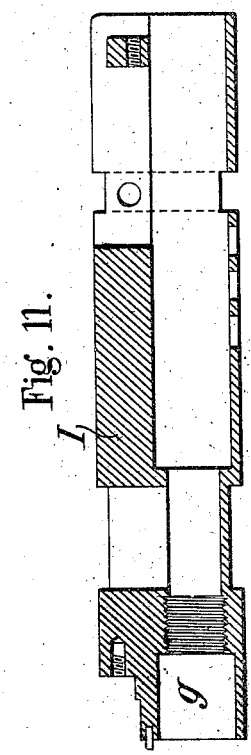
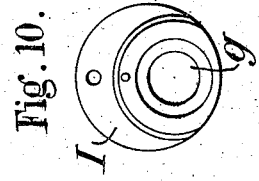
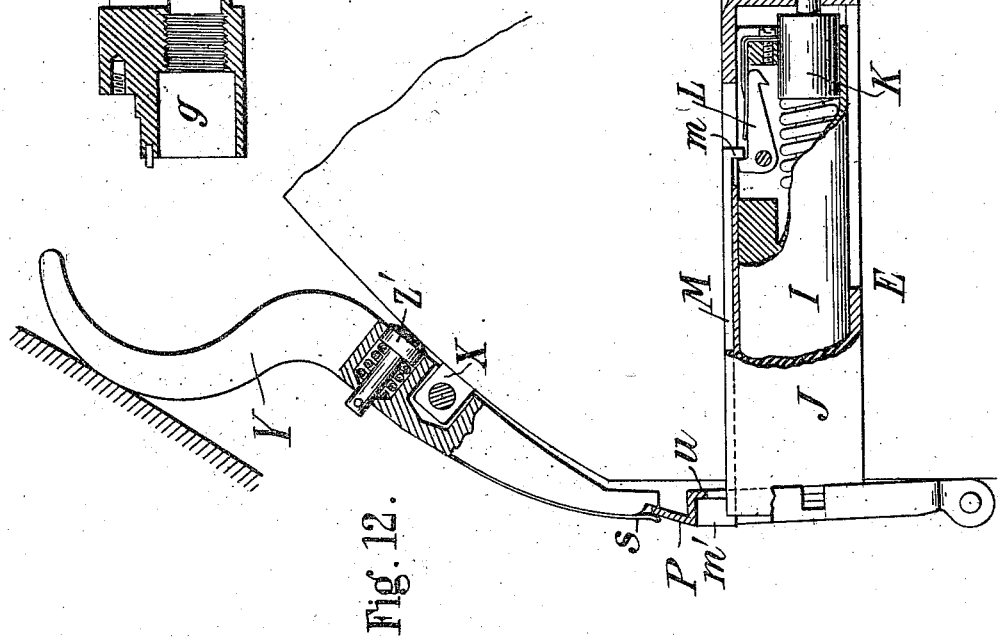
WITNESSES:
INVENTOR:
Frank M. Leavitt
By Attorneys,

F. M. LEAVITT.
EXPLODER FOR AUTOMOBILE TORPEDOES.
APPLICATION FILED MAY 2, 1908.

953,848.

Patented Apr. 5, 1910.
5 SHEETS—SHEET 5.

WITNESSES:

INVENTOR:
Frank M. Leavitt,
By Attorneys,

UNITED STATES PATENT OFFICE.

FRANK M. LEAVITT, OF NEW YORK, N. Y., ASSIGNOR TO E. W. BLISS COMPANY, OF BROOKLYN, NEW YORK, A CORPORATION OF WEST VIRGINIA.

EXPLODER FOR AUTOMOBILE-TORPEDOES.

953,848.  Specification of Letters Patent.  Patented Apr. 5, 1910.

Application filed May 2, 1908. Serial No. 430,509.

*To all whom it may concern:*

Be it known that I, FRANK M. LEAVITT, a citizen of the United States, residing in the borough of Brooklyn, county of Kings, city and State of New York, have invented certain new and useful Improvements in Exploders for Automobile-Torpedoes, of which the following is a specification.

Automobile torpedoes are commonly provided with two heads or bow sections, the one called the "practice head," for use in practice runs, and the other called the "war head," carrying explosive for use in actual warfare.

The present invention relates to the war head, and has particular reference to the means for exploding the explosive charge and to the safety devices for guarding against premature explosion.

The ordinary war head has a small screw propeller at its prow, which, as it is driven through the water, is turned by the water, and turns its screw spindle in a threaded sleeve to bring the firing mechanism from its original safety or inoperative position to the active or operative position, after which, if the propeller strikes any obstacle, such as the hull of a vessel, so as to be driven back thereby, the mechanism acts to explode the charge. This means of effecting the explosion operates well when the torpedo strikes a nearly direct blow against the hull, but if it strikes a glancing blow it often occurs that the charge is not exploded.

One object of the present invention is to provide for more certainly exploding the charge when the torpedo strikes an oblique or glancing blow.

Another object of the present invention is to provide more effective safety devices than those heretofore employed.

The accompanying drawings show the preferred embodiment of my invention.

Figure 2:
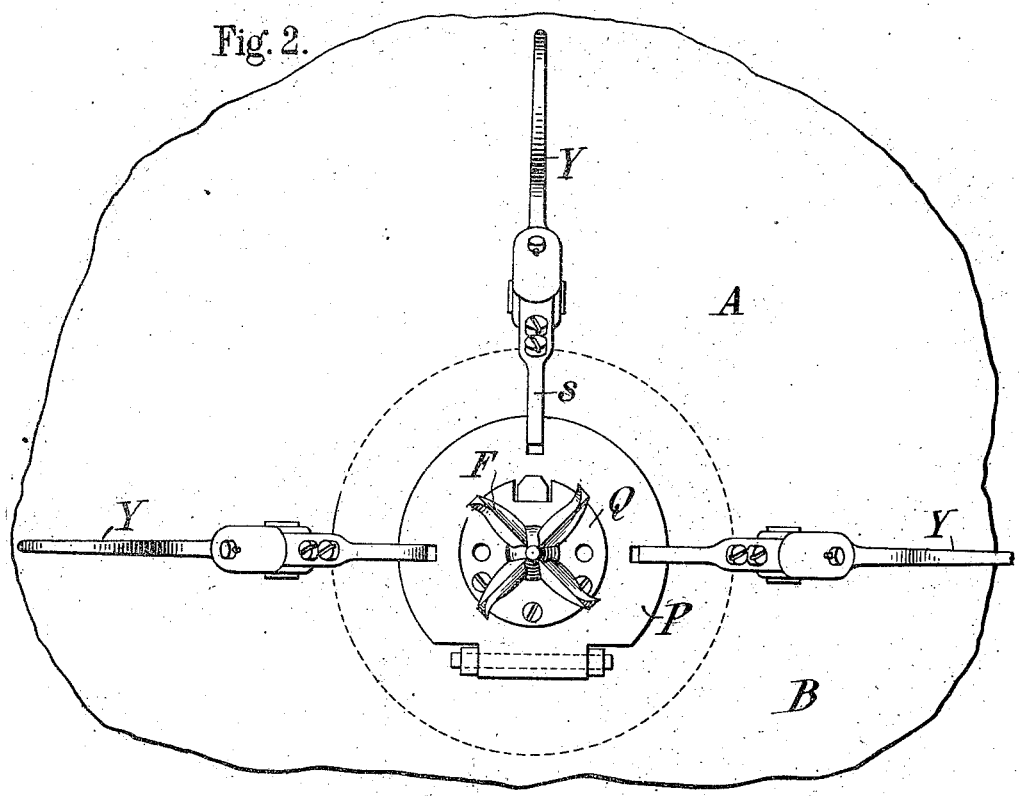
Figure 1:
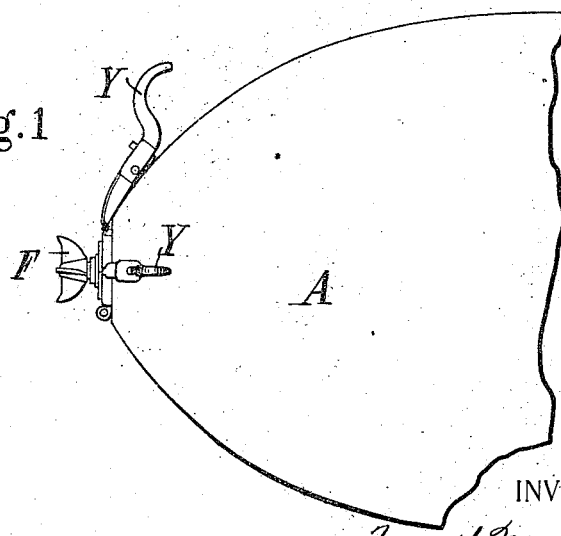
Figure 13:
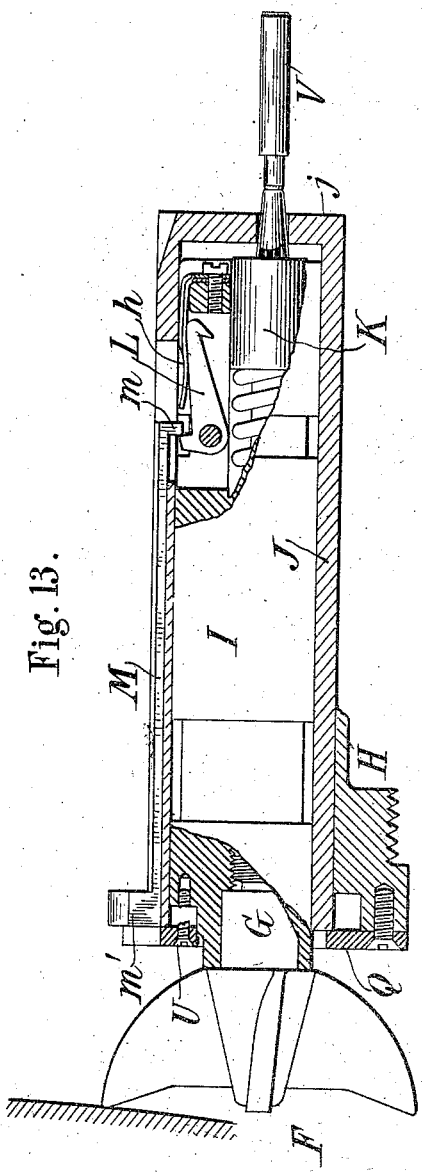
Figure 14:
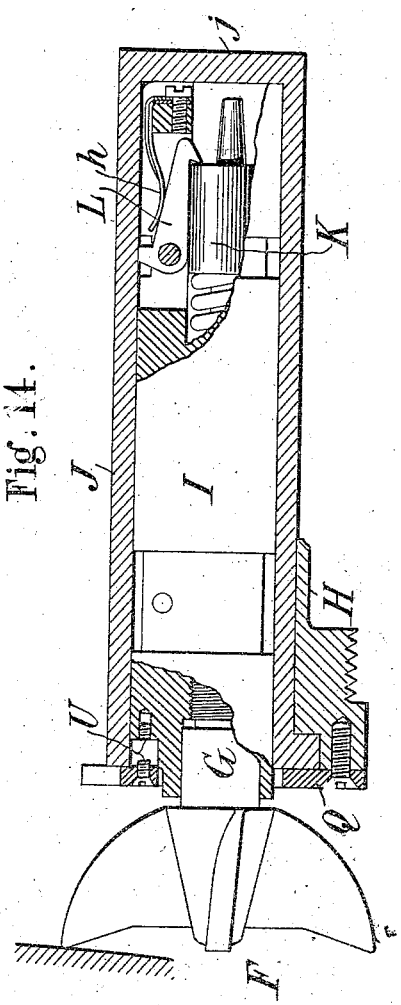

Figure 1 is a side elevation of the bow portion or war head of the torpedo. Fig. 2 is a front elevation thereof on a larger scale. Fig. 3 is a fragmentary vertical longitudinal midsection on a still larger scale, showing the firing mechanism after the torpedo has run far enough to throw the safety device out of action and put the mechanism into operative condition ready for firing. Fig. 4 is a similar section of the parts in the starting position, with the safety devices in position to prevent premature explosion. Fig. 5 is a side elevation of the oscillatory safety sleeve, with the slide carried thereby. Fig. 6 is a section on the line 6—6 in Fig. 4. Fig. 7 is a longitudinal section of the sleeve on the line 7—7 in Fig. 5. Fig. 8 is a front elevation thereof. Fig. 9 is a front elevation partly in section on the plane of the line 9—9 in Fig. 4, showing the parts in the safety position, the parts within the sleeve being removed. Fig. 10 is a front elevation of the central plug, and Fig. 11 is a longitudinal midsection thereof. Fig. 12 is a fragmentary diagrammatic view showing the operation of firing by means of the trigger levers. Fig. 13 is a fragmentary view showing the operation of firing by direct impact of the propeller against the target. Fig. 14 is a similar view to Fig. 13, but showing the action when the impact occurs with the parts in the safety position.

Referring to the drawings, let A designate the detachable bow section of the torpedo which as a whole is called the war head. B (Fig. 3) is the shell or hull thereof.

C is the concentric tube projecting inward from the prow and forming the chamber D for receiving the exploder or firing mechanism which as a whole is designated by the letter E.

F is the usual propeller mounted to project from the prow of the torpedo and having oblique blades or wings, so that as the torpedo progresses the propeller is revolved and turns its screw stem G so as to screw it outwardly from the starting position shown in Fig. 4 to the final or operative position shown in Fig. 3.

The exploder E comprises a body H, a central normally stationary eccentric plug I, an intervening oscillatable safety sleeve J, a spring-pressed hammer K, its trigger L, a trigger-operating slide M, a hinged plate or ring P, a front plate or ring Q, and a safety latch R operated by the stem G of the propeller F.

The body H comprises a concentric neck *a* which is threaded into the nose-piece S; and a concentric portion *b* at its rear end adapted to receive the usual primer cap and having a primer chamber *c*; and between the parts *a* and *b* is an eccentric tubular shell *d* forming a chamber for receiving the interior parts. At its front end the body H has a mutilated flange e to which is screwed a stop f (Fig. 9) and which has threaded holes engaged by the screws which fasten on the front plate Q.

The plug I, which is shown detached in Figs. 10 and 11, is eccentric on its exterior to fit within the sleeve J, and has within it a concentric passage or chamber g which at its front portion receives the propeller spindle G and at its rear portion receives the hammer K and the hammer spring T. It also has a lateral cavity in which is pivoted the trigger L, the leaf spring h of the trigger being also fastened to the plug. The plug has also a cavity in which is pivoted the latch R. The forward portion of the chamber g is screw-threaded to engage screw threads i on the spindle G, whereby as the spindle is turned by the propeller during the forward travel of the torpedo the engagement of these threads gradually screws the spindle forward. The plug I is supported within the sleeve J, and is held from turning, by being fastened to the front plate Q by means of a small fragile screw U.

The safety sleeve J is adapted to turn or oscillate freely in the eccentric space or cavity between the body H and the plug I. This sleeve is shown separately in Figs. 7 and 8. It has a closed rear end j with an eccentric hole k which in the firing position is brought into concentric position in line with the hammer K, as shown in Fig. 3, but in the safety position is turned out of line therewith, so that if, perchance, the hammer should be prematurely released its end would simply strike against the bottom j instead of passing through the hole k and striking the primer V to explode the charge. The sleeve J is formed along one side with a groove or slideway l which receives the trigger-operating slide M. Toward its rear end the sleeve is cut through in line with this slideway in order that the inturned end m of this slide may enter into engagement with the heel of the trigger, as shown in Fig. 3. The front end of the sleeve J is formed with a mutilated flange which has a notch l' to receive the projecting head m' of the slide M. This flange also is cut away to form shoulders o and o' (Fig. 8) for coöperating with the stop f (Fig. 9) to limit the oscillatory movement of the sleeve J to (for example) ninety degrees, as shown.

The sleeve J is provided with a spring W for turning it from the safety to the firing position. This spring may be variously constructed, but as shown it is coiled around a spool p screwed fast to the body H; one end of the spring is fastened to this spool, while the other or free end passes forward through a cut-away portion of its flange and enters a notch q (Fig. 5) in the sleeve, as shown in Fig. 3, the spring being adjusted to such tension as to exert a strong stress against the sleeve, sufficient to turn it quickly and certainly from the safety to the firing position when released.

The sleeve is held initially in the safety position by means of the latch R which initially occupies the position shown in Fig. 4, where its upper portion or nose engages with a shoulder formed within the sleeve J, being preferably the end of a segment r fastened within the sleeve, as shown in Fig. 6, and pressed by the spring stress against the side of the latch. The latch is formed as a toothed sector engaging concentric ribs or teeth formed on the spindle G, as shown, so that as the spindle is slowly screwed forward by the rotation of the propeller F its movement is imparted to the latch, oscillating the latter from the position shown in Fig. 4 to that shown in Fig. 3, whereby its nose is carried out of line with the segment r and thus the sleeve J is released, so that the stress of its spring causes it to quickly turn from the safety to the firing position. This turning movement of the sleeve brings the firing hole k into line with the hammer K; and carries the slide M which previously has been out of engagement with the trigger L into engagement therewith. Prior to this movement there was no means of operating the trigger L, which under any possible circumstances must continue to engage and restrain the hammer K, as shown in Fig. 4.

To the war head abaft the prow are applied firing projections Y Y (Figs. 1 and 2), preferably three in number, which are distinct from the central firing projection formed by the propeller F. These may be variously constructed, but are shown as levers pivoted each on a block X fastened to the shell B and acted upon by a spring Z to press the longer curved outer arm outward and the shorter inner arm back close against the torpedo nose, as shown in Fig. 3. The spring Z is shown as inclosed in a chamber in the lever and pressing through a plunger Z' against the shell. The inner or shorter arm of the lever Y engages the hinged plate or ring P, having a spring s pressing against the front of this plate, and terminates in the finger t projecting behind the plate, so that the tilting of the lever Y will act to press the plate outwardly as shown in Fig. 12. This action occurs when any one of the levers Y strikes the target or other obstacle having sufficient resistance to overcome its spring. The forward displacement of the ring P carries with it the slide M by reason of the head m' thereof projecting outwardly onto the flange u of the ring P. If the parts are in the safety position this movement of the slide is an idle one, since the slide is out of engagement with the trigger. If, however, the sleeve J has turned to the firing position, this movement of the slide M pulls the trigger, as shown in Fig. 12, and releases the hammer, which flies backward, passes through the hole $k$, drives back the primer pin V and explodes the fulminate.

The charge may be fired also by direct impact of the propeller F against the target. Upon such impact the whole momentum of the torpedo is made effective to drive the body H and sleeve J with the front plate Q forwardly; while the propeller, its spindle, and the plug I are arrested by the encounter with the target or other obstacle. This results in the breakage of the fragile screw U, which is purposely made the weakest part. Thereupon a relative movement occurs between the body H carrying with it the sleeve J, on the one hand, and the plug I carrying with it the trigger L, on the other. If the parts are in the firing position this backward movement of the trigger is, because of its heel being engaged by the rear shoulder $m$ of the slide M, accompanied by a tilting movement of the trigger which releases the hammer, and the latter is projected rearwardly through the hole $k$ against the pin V, as shown in Fig. 13, and explodes the fulminate. If, however, the parts are in the safety position, the only effect of the impact is an idle backward movement of the plug without any release of the trigger, as shown in Fig. 14. Even if the trigger should be released, as possibly by the breaking of its spring, the consequent liberation of the hammer would merely project it backward against the imperforate portion of the rear wall $j$ of the safety sleeve, and without other result.

The general operation will be apparent from the foregoing description. The parts of the exploder are put together and set to the safety position with the spindle G screwed fully back before inserting the body H in the chamber D. During the first portion of the run of the torpedo the parts remain in the safety position, so that an unexpected encounter with any obstacle could result in no explosion. After running a predetermined time, the screwing forward of the spindle G releases the latch R, and the safety sleeve turns to the firing position; if after this occurs the torpedo strikes either a direct or glancing blow against any obstacle affording sufficient resistance, the exploder is operated in one or the other of the ways already explained, thereby exploding the charge.

This invention is not limited to the precise details or combinations of apparatus described, although the described mechanism affords the preferred and most complete embodiment of the invention. The mechanism may be considerably simplified or otherwise modified without departing from its essential features.

The propeller F and its screw-connection constitute a simple form of "timing mechanism" for insuring a predetermined delay before the safety device is displaced to its firing position. The firing levers constitute eccentric trip devices adapted to be displaced by a glancing blow against a sufficient obstruction; the levers may be replaced by other equivalent forms of trip devices.

What I claim is:—

1. A torpedo exploder having a hammer, a safety device movable into or out of the path of the hammer, and a timing device driven proportionately to the speed of the torpedo, for operating the safety device.

2. A torpedo exploder having a hammer, a safety device having a hole and movable to bring said hole out of or into the path of the hammer, and a timing device driven proportionately to the speed of the torpedo, for operating the safety device.

3. A torpedo exploder having a hammer, a safety device comprising an oscillating part having a hole and movable to bring said hole out of or into the path of the hammer, and a timing device driven proportionately to the speed of the torpedo, for operating the safety device.

4. A torpedo exploder having a hammer, a safety device adapted to be set originally to prevent the firing movement of said hammer, a latch for holding said safety device in the safety position, and a timing device for subsequently withdrawing said latch.

5. A torpedo exploder having a safety device movable from a safety to a firing position, a spring for so moving it, a latch for holding it in the safety position, and a timing device for withdrawing said latch comprising a propeller turned by the movement of the torpedo through the water.

6. A torpedo exploder having a safety device movable from a safety to a firing position, a spring for so moving it, a latch for holding it in the safety position, and a timing device for withdrawing said latch comprising a propeller turned by the movement of the torpedo through the water.

7. A torpedo exploder having a hammer, a trigger for restraining the hammer, a tripping device for operating the trigger, a safety device comprising means for connecting the tripping device with the trigger, said means in the safety position being displaced to disconnect said parts, and a timing device for operating the safety device to restore such connecting means and establish operative connection with the trigger.

8. A torpedo exploder having a hammer, a trigger for restraining the hammer, a safety device, and means for operating the trigger comprising a movable part carried by the safety device, the latter being movable to carry said part from an inoperative safety position to a firing position where it is in operative relation to the trigger.

9. A torpedo exploder having a hammer, a trigger for restraining the hammer, a safety device, and means for operating the trigger comprising a slide carried by the safety device, the latter being oscillatable to move said slide laterally from an inoperative safety position to a firing position in engagement with the trigger.

10. A torpedo exploder having a safety device consisting of an oscillatable sleeve, a spring tending to turn it, a latch holding it in the safety position, stops for limiting its movement, and means for withdrawing said latch.

11. A torpedo exploder having a safety device consisting of an oscillatable sleeve, a slide carried by said sleeve, and means for oscillating said sleeve to displace the slide from an inoperative to an operative position.

12. A torpedo exploder comprising a tubular body, a central plug, a hammer within said plug, and a safety device consisting of a sleeve between the body and plug, rotatable from a safety to a firing position.

13. A torpedo exploder comprising a tubular body, a safety device consisting of a sleeve oscillatable therein, a non-rotative plug supported within said sleeve, and means for turning said sleeve from a safety to a firing position.

14. A torpedo exploder having a safety device, a latch for restraining it, and a propeller and screw adapted to release said latch after a predetermined movement.

15. A torpedo exploder having a safety device, an oscillatable latch, and a propeller having a screw-spindle engaging said latch to oscillate it.

16. A torpedo exploder having a safety device comprising a spring-pressed part, a latch for restraining it, a propeller, and a connection between said propeller and the latch for displacing the latter.

17. A torpedo exploder having a safety device, an oscillatable latch formed as a toothed segment, and a propeller having a screw-spindle and peripheral grooves engaging said segment teeth to turn the latch.

18. A torpedo exploder having a trip device comprising a portion located externally on the lateral bow of the torpedo abaft the prow so as to receive and be displaced by a glancing blow, and exploding means operated by its displacement to explode the charge.

19. A torpedo exploder having a central portion at its prow adapted to be displaced by a direct blow, and an eccentric portion distinct from said central portion and located abaft the prow, adapted to be displaced by a glancing blow, and exploding means operated by the displacement of either to explode the charge.

20. A torpedo exploder having a central projection at its prow adapted to be displaced by a direct blow, and eccentric projections distinct from said central projection, located abaft the prow and above and laterally of the central projection, and each adapted to be displaced by a glancing blow, and exploding means operated by such displacement of either projection to explode the charge.

21. A torpedo exploder having eccentric projections located respectively above and laterally of the central axis, and abaft the prow, movable independently of each other, and each adapted to be displaced by a glancing blow, and exploding means operated by such displacement of either projection to explode the charge.

22. A torpedo exploder having a trip lever with an arm thereof projecting eccentrically in position to be displaced by a glancing blow and exploding means operated thereby to explode the charge.

23. A torpedo exploder having a trip lever pivoted to the torpedo with an arm thereof projecting in position to be displaced by impact of the torpedo against an obstacle, and exploding means operated thereby when so displaced to explode the charge.

24. A torpedo exploder having a trip lever, a movable ring engaged thereby, a trigger, and a connection between said ring and trigger, whereby the displacement of said lever operates the trigger.

25. A torpedo exploder having a plurality of trip levers, a movable ring engaged by each of them, and means for exploding the charge operated from said ring.

In witness whereof, I have hereunto signed my name in the presence of two subscribing witnesses.

FRANK M. LEAVITT.

Witnesses:
CHARLES EDWIN POLLARD,
WILLIAM RILEY.